United States Patent [19]
Horiuchi et al.

[11] Patent Number: 5,922,038
[45] Date of Patent: Jul. 13, 1999

[54] VEHICLE-BEHAVIOR CONTROL SYSTEM WITH WHEEL SPEED FAILURE DETECTION

[75] Inventors: Yutaka Horiuchi; Yutaka Maruyama; Susumu Takahashi; Yoshikazu Nojiri; Ryo Suzuki; Toshio Yahagi, all of Wako, Japan

[73] Assignee: Honda Giken Kogyo Kabushiki Kaisha, Tokyo, Japan

[21] Appl. No.: 08/715,485

[22] Filed: Sep. 18, 1996

[30] Foreign Application Priority Data

Sep. 20, 1995 [JP] Japan .................................. 7-241055

[51] Int. Cl.$^6$ ...................................................... B60T 8/60
[52] U.S. Cl. .......................... 701/34; 701/76; 303/122.05
[58] Field of Search .................. 701/34, 76; 303/122.04, 303/122.05, 173; 340/453, 457.3

[56] References Cited

U.S. PATENT DOCUMENTS 4,722,576  2/1988  Matsuda ..................................... 303/92
4,969,695  11/1990  Maehata et al. .......................... 303/92
5,170,343  12/1992  Matsuda ................................... 364/184

FOREIGN PATENT DOCUMENTS 6-144718  2/1988  Japan .
3-202775  9/1991  Japan .

*Primary Examiner*—Michael Zanelli
*Attorney, Agent, or Firm*—Nikaido Marmelstein Murray & Oram LLP

[57] ABSTRACT

In a vehicle behavior control system, a failure of a wheel speed sensor is detected by a wheel speed sensor failure detecting device based on the mutual comparison of wheel speeds detected by wheel speed sensors, respectively. When the failure of the wheel speed sensor is detected, a preselected fail-safe operation is carried out by a fail-safe device. A fail-safe operation prohibiting signal is output only for a predetermined time from the establishment of a state in which the operation of a parking brake is detected by a parking brake operation detecting device and a during-traveling signal is output from a during-traveling signal generated device. When the fail-safe operation prohibiting signal is output, the fail-safe operation by the fail-safe device is prohibited by a fail-safe operation prohibiting device.

2 Claims, 2 Drawing Sheets

Input signal to
monostable circuit

Output signal from
monostable circuit

Output signal
from inverter

VEHICLE-BEHAVIOR CONTROL SYSTEM WITH WHEEL SPEED FAILURE DETECTION

BACKGROUND OF THE INVENTION

1. Field of the Invention

The present invention relates to a vehicle-behavior control system for a vehicle, including actuators, wheel speed sensors, a controller, a wheel speed sensor, failure detecting means and a fail-safe means. The actuators are capable of changing the vehicle behavior. The wheel speed sensors individually detect a plurality of wheel speeds, respectively. The controller determines whether the control of the vehicle behavior should be carried out, based on the wheel speeds detected by the wheel speed sensors, respectively, and controls the operations of the actuators based on the result of the determination. The wheel speed sensor failure detecting means detects a failure of the wheel speed sensors based on the mutual comparison of the wheel speeds detected by the wheel speed sensors, respectively. The fail-safe means performs a predetermined fail-safe operation based on a detection of failure of the wheel speed sensors by the wheel speed sensor failure detecting means.

2. Description of the Related Arts

A conventionally known vehicle behavior control system (for example, see Japanese Patent Application Laid-open No. 3-202775 and Japanese Utility Model Application Laid-open No. 63-23650) in an anti-lock brake control system in a vehicle, detects an abnormality of one or more of a plurality of wheel speed sensors, due to the sensor falling-off the wheels or the like, by the wheel speed or speeds of the one or more wheels being lower than the other wheel speeds. Thus, a fail-safe operation such as the turning-ON of a warning lamp, the restoration to a normal brake state and the like is carried out.

If a vehicle driver accidentally drives the vehicle with a parking brake set, or applies the parking brake for a side-turn operation during traveling of the vehicle, the wheel speed of the wheel to which the parking brake has been applied is greatly decreased when compared with the wheel speeds of the other wheels. Therefore, in the known system, the failure of the wheel speed sensor can be accidentally detected, so that the fail-safe operation is carried out.

To solve such a problem, detection of the failure by the wheel speed sensor failure detecting means is carried out over a relatively long time. Thus, it is difficult for the fail-safe operation to be produced. Another way to solve this problem is to prohibit the detection of the failure by the wheel speed sensor failure detecting means when the parking brake is set. However, if the time for detection of the failure by the wheel speed sensor failure detecting means is set to a relatively long time, the start of the fail-safe operation is delayed when the wheel speed sensor has actually failed. In addition, if the detection of the failure by the wheel speed sensor failure detecting means is prohibited immediately upon application of the parking brake, it is difficult to detect the failure of the wheel speed sensor when a switch for detecting the operation of the parking brake or the like has failed. If the fail-safe operation is conducted when the application of the parking brake takes a given time or more, the detection of the failure of the wheel speed sensor cannot be made. For example, when the vehicle is traveling with a light parking brake applied to such an extent that an influence is exerted on the antilock brake control, fail-safe processing is carried out, which is not preferable.

SUMMARY OF THE INVENTION

Accordingly, it is an object of the present invention to provide a vehicle behavior control system wherein an immediate fail-safe processing can be performed only upon failure of a wheel speed sensor and a failure of the wheel speed sensor can be reliably detected. Moreover, the failure of a wheel speed sensor is prevented from being accidentally detected attendant with a parking brake. An immediate fail-safe processing is performed only upon failure of a wheel speed sensor if the parking brake is set. Also, a failure of the wheel speed sensor is reliably detected when the parking brake is set.

To achieve the above object, according to the present invention, there is provided a vehicle-behavior control system for a vehicle, including actuators capable of changing the vehicle behavior. Wheel speed sensors individually detect a plurality of wheel speeds, respectively. A controller determines whether the control of the vehicle behavior should be carried out, based on the wheel speeds detected by the wheel speed sensors, respectively, and controls the operations of the actuators based on the result of the determination. A wheel speed sensor failure detecting means detects a failure of the wheel speed sensors based on the mutual comparison of the wheel speeds detected by the wheel speed sensors. respectively. A fail-safe means performs a predetermined fail-safe operation based on a detection of failure of the wheel speed sensors by the wheel speed sensor failure detecting means. The vehicle-behavior control system comprises a parking brake operation detecting means for detecting an operational state of a parking brake. A during-traveling signal generating means outputs a during-traveling signal by detecting that the vehicle is in a traveling state. A fail-safe operation prohibiting signal outputting means outputs a fail-safe operation prohibiting signal only for a predetermined time from the establishment of a state in which the operation of the parking brake is detected by the parking brake operation detecting means and the during-traveling signal is output from the during-traveling signal generating means. A fail-safe operation prohibiting means prohibits the fail-safe operation of the fail-safe means when the fail-safe operation prohibiting signal outputting means outputs the fail-safe operation prohibiting signal.

With such an arrangement, it is possible to prevent the failure of the wheel speed sensor from being accidentally detected attendant with the parking brake, while enabling the reliable detection of the wheel speed sensor during non-operation of the parking brake, as well as enabling an immediate fail-safe processing upon failure of a wheel speed sensor.

The above and other objects, features and advantages of the invention will become apparent from the following description of a preferred embodiment taken in conjunction with the accompanying drawings.

DETAILED DESCRIPTION OF THE PREFERRED EMBODIMENT

The present invention will now be described by way of a preferred embodiment with reference to the accompanying drawings.

Figure 1:
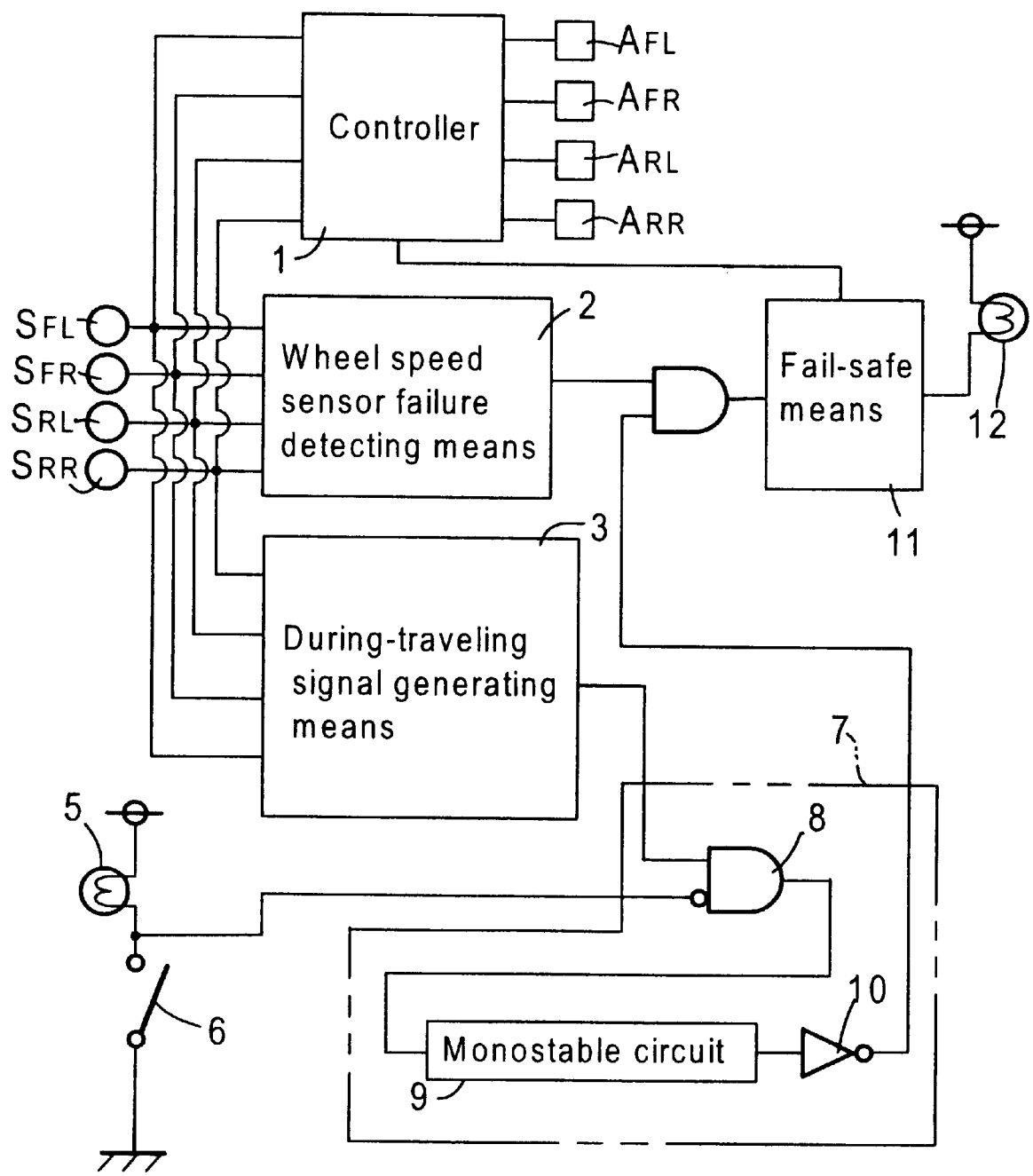
FIG. 1 is a block diagram illustrating the arrangement of a vehicle behavior control system according to the present invention.

Referring first to FIG. 1, wheel speeds of wheels in a 4-wheel vehicle are individually detected by wheel speed sensors $S_{FL}$, $S_{FR}$, $S_{RL}$ and $S_{RR}$, respectively. The wheel speeds detected by the wheel speed sensors $S_{FL}$, $S_{FR}$, $S_{RL}$ and $S_{RR}$, are input to a controller 1. Actuators $A_{FL}$, $A_{FR}$, $A_{RL}$ and $A_{RR}$ for adjusting the hydraulic braking pressure for the wheel brakes to change the behavior of the vehicle are connected to the controller 1. The controller 1 determines whether the wheel is about to fall into a locked state during braking, based on the wheel speeds detected by the wheel speed sensors $S_{FL}$, $S_{FR}$, $S_{RL}$ and $S_{RR}$, i.e., determines whether an anti-lock brake control should be carried out, and controls the operations of the corresponding actuator $A_{FL}$, $A_{RF}$, $A_{RL}$ and $A_{RR}$ based on the determination result.

The wheel speeds detected by the wheel speed sensors $S_{FL}$, $S_{FR}$, $S_{RL}$ and $S_{RR}$ are also input to a wheel speed sensor failure detecting means 2. In the wheel speed sensor failure detecting means 2, the failure of the wheel speed sensors $S_{FL}$, $S_{FR}$, $S_{RL}$ and $S_{RR}$ is detected based on the mutual comparison of the wheel speeds. If it is determined that any of the wheel speed sensors $S_{FL}$, $S_{FR}$, $S_{RL}$ and $S_{RR}$ has failed, then a high-level failure detection signal is output from the wheel speed sensor failure detecting means 2.

The wheel speeds detected by the wheel speed sensors $S_{FL}$, $S_{FR}$, $S_{RL}$ and $S_{RR}$ are also input to a during-traveling signal generating means 3. In the during-traveling signal generating means 3, when the maximum value of each wheel speed has exceeded a preset value, e.g., 10 km/hr, it is determined that the vehicle is traveling. When it is determined that the vehicle is traveling, a high-level during-traveling signal output from the during-traveling signal generating means 3 is input to a fail-safe operation prohibiting signal outputting means 7. The during-traveling signal generating means 3 may be of a type which outputs a during-traveling signal in response to the speed of the follower wheel exceeding the preset value.

Figures 2A, 2B, 2C:
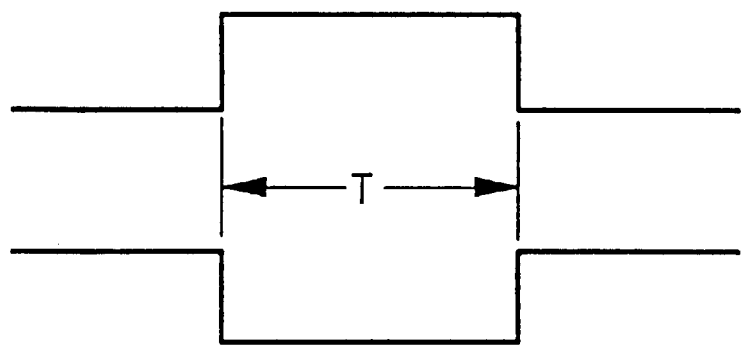
FIG. 2(a)–(c) are timing chart for elements constituting a fail-safe operation prohibiting signal outputting means.

A parking brake switch 6, as a parking brake operation detecting means for detecting the operated state of a parking brake, is connected in series to a brake warning lamp 5. A point of connection between the parking brake switch 6 and the brake warning lamp 5 is connected to the fail-safe operation prohibiting signal outputting means 7. The fail-safe operation prohibiting signal outputting means 7 is comprised of an AND gate 8, to which the connection point is connected in an inverted manner, and an output end of the during-traveling signal generating means 3 is connected, a monostable circuit 9 to which an output signal from the AND gate 8 is input, and an inverter 10 connected to an output end of the monostable circuit 9. Thus, when a state in which the parking brake is operated to turn the parking brake switch ON and the high level during-traveling signal is output from the during-traveling signal generating means 3, is established, the AND gate 8 output a signal which remains at a high level for a period of time for which the above-described state is sustained. When the high-level signal from the AND gate 8 is input to the monostable circuit 9, the monostable circuit 9 as shown in FIG. 2(a) outputs a high-level signal which is sustained for a predetermined time T from the rising of the input signal as shown in FIG. 2B, and the output from the monostable circuit 9 is inverted in the inverter 10 as shown in FIG. 2c. Thus, the fail-safe operation prohibiting signal outputting means 7 outputs a low-level fail-safe operation prohibiting signal which is sustained for the predetermined time T from the establishment of a state in which the operation of the parking brake is detected by the parking brake switch 6 and the during-traveling signal is output from the during-traveling signal generating means 3. The predetermined time T is set slightly longer than a time required for a driver to perform a side-turn operation by the parking brake.

An output signal from the wheel speed sensor failure detecting means 2 and an output signal from the fail-safe operation prohibiting signal outputting means 7 are input in parallel to the AND gate 4 as the fail-safe operation prohibiting means. Therefore, even if a high-level failure detection signal from the wheel speed sensor failure detection signal from the wheel speed sensor failure detecting means 2 has been input to the AND gate 4, based on the determination of the fact that any one of the wheel speed sensors $S_{FL}$, $S_{FR}$, $S_{RL}$ and $S_{RR}$ has failed, the AND gate 4 outputs a low-level signal in a state in which the fail-safe operation prohibiting signal has been output from the fail-safe operation prohibiting signal outputting means 7.

The output signal from the AND gate 4 is input to a fail-safe means 11. Only when a high-level signal from the AND gate 4 is input to the fail-safe means 11, the fail-safe means 11 performs a fail-safe operation such as providing a signal to the controller 1, so that the warning lamp 12 is turned ON, or the anti-lock brake control is discontinued and restored to a usual brake state. A latch circuit may be provided within the fail-safe means 11, so that once a fail-safe operation has been started, the fail-safe operation may be continued next time a power source is turned on.

The operation of this embodiment will be described below. When it is detected by the wheel speed sensor failure detecting means 2 that any one of the wheel speed sensors $S_{FL}$, $S_{FR}$, $S_{RL}$ and $S_{RR}$ has failed, i.e., when the wheel speed sensor failure detecting means 2 outputs a high-level signal, the fail-safe operation by the fail-safe means 11 is basically carried out. However, when the state is established in which the operation of the parking brake is detected by the parking brake switch 6 and the during-traveling signal is output from the during-traveling signal generating means 3, a low-level fail-safe operation prohibiting signal, sustained for the predetermined time T from such establishment, is output from fail-safe operation prohibiting signal outputting means 7, and even if the wheel speed sensor failure detecting means 2 has output the high-level signal, the fail-safe operation provided by the fail-safe means 11 is prohibited by the action of the AND gate 4.

Even when the vehicle is traveling, the fail-safe operation is prohibited only for the predetermined time T after operation of the parking brake, even if any of the wheel speed sensors $S_{FL}$, $S_{FR}$, $S_{RL}$ and $S_{RR}$ has failed. Even when the vehicle is started to travel in a state in which the parking brake is operative, the fail-safe operation is prohibited for the predetermined time T from the start of the traveling, even if any of the wheel speed sensors $S_{FL}$, $S_{FR}$, $S_{RL}$ and $S_{RR}$ has failed. Therefore, even if the wheel speed sensor failure detecting means 2 accidentally detects the fact that any of the wheel speed sensors $S_{FL}$, $S_{FR}$, $S_{RL}$ and $S_{RR}$ has failed due to an influence of the parking brake, a fail-safe processing cannot be carried in response to such mis-detection, and when any of the wheel speed sensors $S_{FL}$, $S_{FR}$, $S_{RL}$ and $S_{RR}$ has failed, an immediate fail-safe processing is carried out. In a side-turn operation, the fail-safe processing is carried out after the side-turn operation by the fact that the fail-safe operation is permitted after a lapse of the predetermined time T, when the high-level failure detection signal has been output from the wheel speed sensor failure detecting means 2. Further, even if the parking brake switch 6 has failed in its ON state, the fail-safe processing by the fail-safe means 11 can be performed after the lapse of the predetermined time in response to the outputting of the high-level failure detection signal from the wheel speed sensor failure detecting means 2. Moreover, when a light parking brake is operative to such an extent that the wheel speed sensor failure detecting means 2 does not determine the failure of the wheel speed sensors $S_{FL}$, $S_{FR}$, $S_{RL}$ and $S_{RR}$, the fail-safe processing cannot be carried out, and the anti-lock brake control can be continued.

The wheel speed sensor failure detecting means 2, the during-traveling signal generating means 3, the fail-safe operation prohibiting signal outputting means 7 and the AND gate 4 in the embodiment can be constituted by a microprocessor and its program. The system according to the present invention is widely applicable not only to the anti-lock brake control system, but also systems for controlling the behavior of a vehicle using detection values detected by wheel speed sensors, e.g., a braking force distribution control system, a traction control system and the like.

Although the embodiment of the present invention has been described in detail, it will be understood that the present invention is not limited to the above-described embodiment, and various modifications may be made without departing from the spirit and scope of the invention defined in the claims.

What is claimed is:

1. A vehicle-behavior control system for a vehicle, including actuators capable of changing the vehicle behavior, wheel speed sensors for individually detecting a plurality of wheel speeds, respectively, a controller which determines whether the control of the vehicle behavior is carried out, based on the wheel speeds detected by said wheel speed sensors, respectively, and which controls the operations of said actuators based on the result of the determination, a wheel speed sensor failure detecting means for detecting a failure of the wheel speed sensors based on mutual comparison of the wheel speeds detected by said wheel speed sensors, respectively, and a fail-safe means for performing a predetermined fail-safe operation based on a detection of failure of the wheel speed sensors by said wheel speed sensor failure detecting means, said vehicle-behavior control system comprising:

a parking brake operation detecting means for detecting an operational state of a parking brake;

a during-traveling signal generating means for outputting a during-traveling signal by detecting that the vehicle is in a traveling state;

a fail-safe operation prohibiting signal outputting means for outputting a fail-safe operation prohibiting signal only for a predetermined time from establishment of a state in which operation of the parking brake is detected by said parking brake operation detecting means and the during-traveling signal is output from said during-traveling signal generating means; and a fail-safe operation prohibiting means for prohibiting the fail-safe operation of said fail-safe means when said fail-safe operation prohibiting signal outputting means outputs the fail-safe operation prohibiting signal.

2. A vehicle-behavior control system according to claim 1, wherein said fail-safe operation prohibiting signal outputting means includes an AND gate, a monostable circuit and an inverter.

* * * * *